United States Patent [19]

Medlin, Sr.

[11] Patent Number: 4,732,356

[45] Date of Patent: Mar. 22, 1988

[54] OUTLET BOX BRACKET WITH ADJUSTABLE STABILIZER

[76] Inventor: Lewis B. Medlin, Sr., P.O. Box 237, Blue Ridge, Va. 24064

[21] Appl. No.: 922,894

[22] Filed: Oct. 23, 1986

[51] Int. Cl.4 .................................................. G12B 9/00
[52] U.S. Cl. ...................................... 248/27.1; 174/58; 220/3.9; 248/DIG. 6
[58] Field of Search .................. 248/27.1, DIG. 6; 220/3.9, 3.92; 174/58

[56] References Cited

U.S. PATENT DOCUMENTS

| | | | |
|---|---|---|---|
| 1,206,431 | 11/1916 | Graybill | 220/3.4 |
| 1,795,224 | 3/1931 | Mangin | 248/DIG. 6 X |
| 3,767,151 | 10/1973 | Seal et al. | 248/DIG. 6 X |
| 4,057,164 | 11/1977 | Maier | 248/DIG. 6 X |
| 4,135,337 | 1/1979 | Medlin | 220/3.92 X |
| 4,399,922 | 8/1983 | Horsley | 248/DIG. 6 X |
| 4,447,030 | 5/1984 | Nattel | 248/27.1 |
| 4,533,060 | 8/1985 | Medlin | 220/3.9 |
| 4,572,391 | 2/1986 | Medlin | 220/3.9 |
| 4,603,789 | 8/1986 | Medlin, Sr. | 220/3.9 |

*Primary Examiner*—J. Franklin Foss
*Assistant Examiner*—David L. Talbott
*Attorney, Agent, or Firm*—B. B. Olive

[57] ABSTRACT

An outlet box mounting bracket is formed with a right angle extension to stabilize the bracket. The right angle extension can be bent to reduce the effective size of the extension or can be secured to an auxiliary extension plate to increase the effective size of the extension. The auxiliary extension plate is also adapted to be bent for obtaining further variations in effective size of the extension.

9 Claims, 14 Drawing Figures

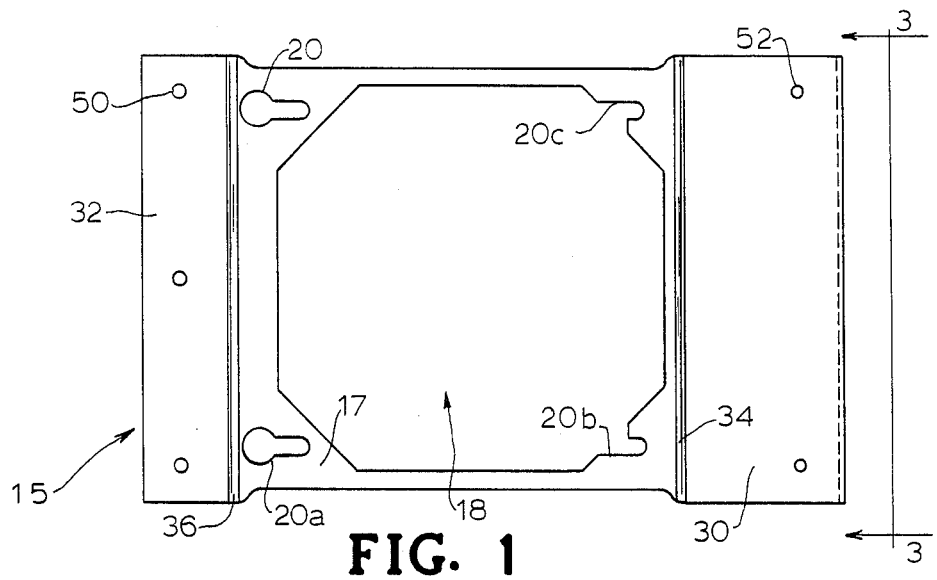
FIG. 1
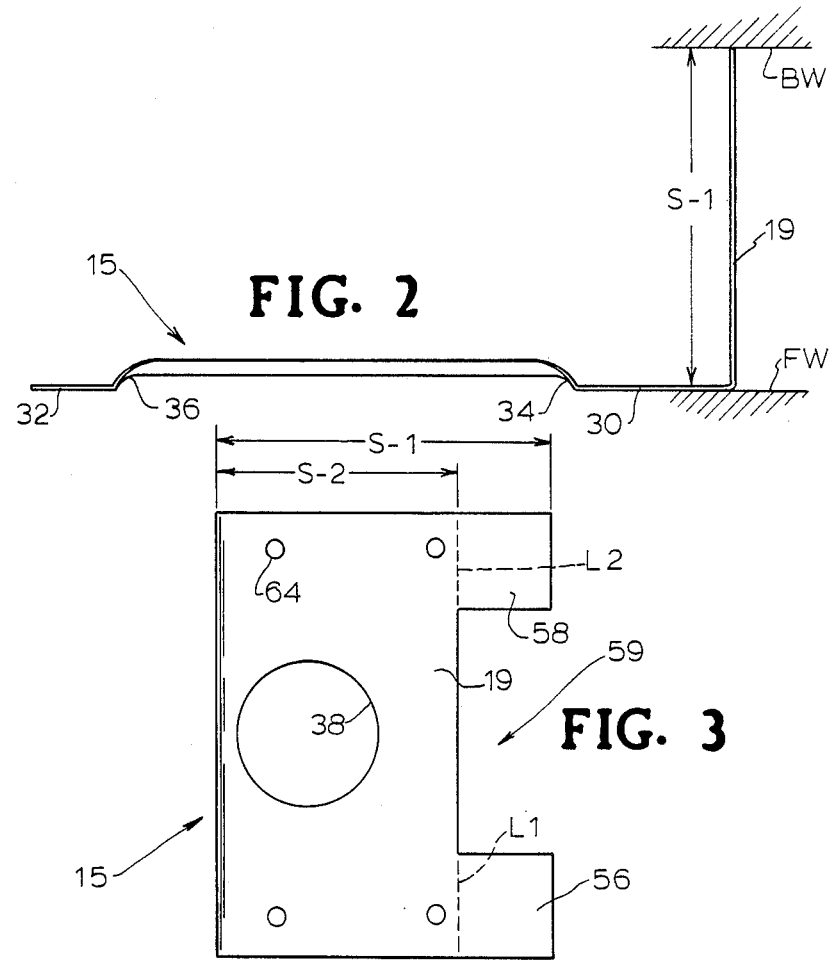
FIG. 2
FIG. 3

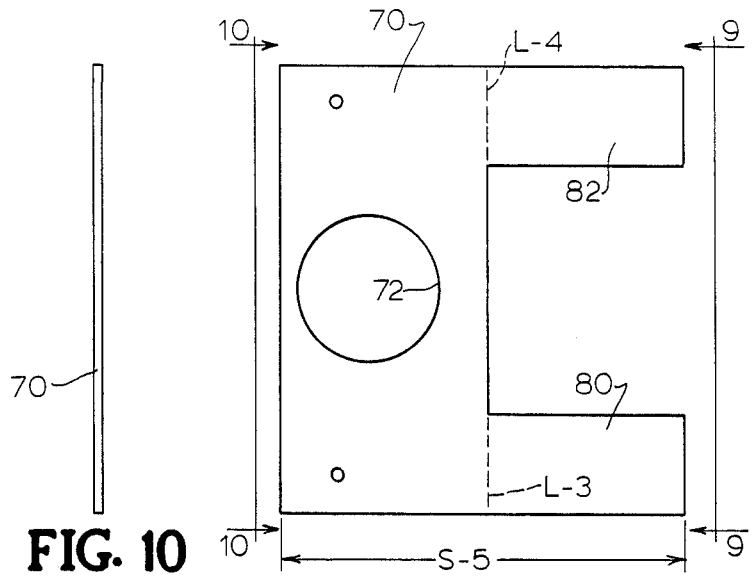
FIG. 10   FIG. 8   FIG. 9
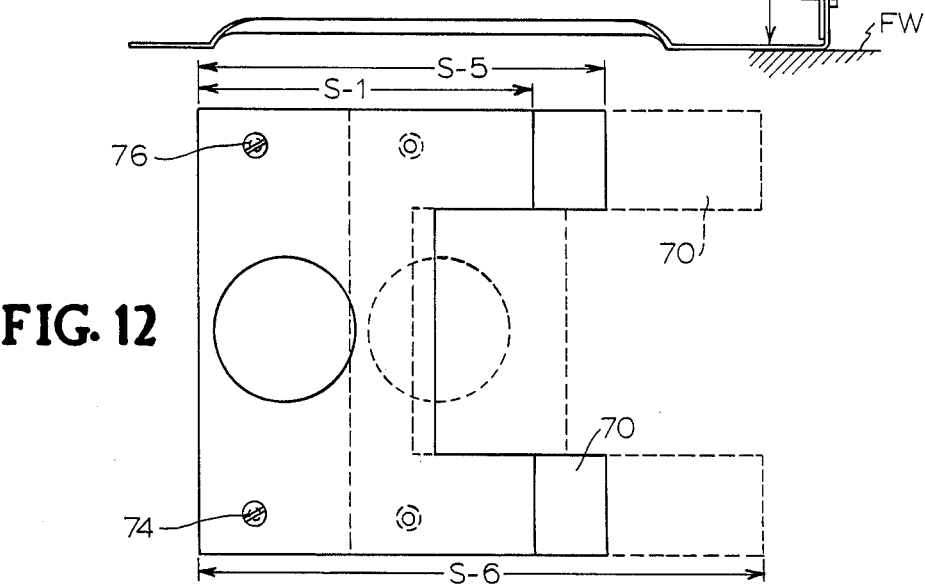
FIG. 11
FIG. 12

OUTLET BOX BRACKET WITH ADJUSTABLE STABILIZER

DESCRIPTION

1. Technical Field

The present invention relates to brackets for mounting of electrical equipment and specifically for the mounting of electrical outlet and junction boxes (hereinafter referred to only as outlet boxes) primarily to vertical metal or wooden studs during building construction and/or repair recognizing that such brackets are sometime also secured to ceilings, plaster or drywall during construction.

2. Background Art

When outlet boxes are supported from a metal or wooden stud it has been found desirable to stabilize the cantilevered box and bracket. U.S. Pat. No. 3,767,151 illustrates one means of stabilizing the outlet box by attaching a bracket directly to the box. In U.S. Pat. No. 4,057,164 an adjustable screw is used for stabilizing the outlet box. An L-shaped bracket for mounting outlet boxes formed of a unitary section of sheet metal and having screw passages enabling the outlet box to be mounted without the necessity of removing the mounting screws was developed and marketed by E-Z Mount Bracket Company, Blue Ridge, Va., after issue of the mentioned prior art Patent No. 4,057,164. The E-Z Mount bracket was followed by the marketing of the type bracket illustrated in U.S. Pat. No. 4,399,922 in which a portion of a unitary L-shaped mounting bracket is formed as an extension to stabilize both the bracket and the outlet box. Oversize screw clearance holes facilitate mounting of the box and break-away strips vary the length of the extension. Other useful background information relevant to the present invention may be found in U.S. Pat. Nos. 4,135,337, 4,533,060, 4,569,458, and 4,572,391.

As another aspect of the prior art, various techniques have been followed for minimizing the amount of metal required to form the bracket. For example, in U.S. Pat. No. 1,206,431 it will noted that a right angled fastening portion of the bracket is formed by pushing out metal from the main body portion of the bracket. In prior U.S. Pat. No. 4,603,789 there is illustrated in FIGS. 37-40 a stabilizing arm formed by pushing metal out of an extension plate integrally formed with a mounting bracket. Such arrangement thus provides a desired stabilizer or stiffening arm without requiring additional metal.

The mentioned E-Z Mount outlet bracket, as well as the type bracket illustrated, for example, in U.S. Pat. Nos. 4,135,337, 4,399,922 and 4,533,060, requires the forming of a large central opening in the plate body and which registers with the interior chamber of the outlet box. The outlet box may be a large size 4-11/16" square or a small size 4" square and the opening of corresponding size. Thus, substantial metal has been diverted to waste in forming the required opening. The invention of copending application Ser. No. 893,228, filed Aug. 4, 1986, entitled "Outlet Box Bracket With Stabilizer" recognized that the opening dimension in the lengthwise direction of the bracket makes possible the forming of a bracket stabilizer suited to the width of the space between the front drywall where the bracket is mounted and the back drywall.

The invention as described in the copending application Ser. No. 893,228 provided a still further improved outlet box mounting bracket in which a stiffening arm or stabilizer is formed from metal originally incorporated in the plate body portion to which the outlet box is secured and typically removed to form a large central opening and disposed of as scrap.

The space between two drywalls in typical construction may be 2½", 3½", 4", 5" or 6". The adjustable screw outlet box support of Patent No. 4,057,164 is not compatible with the practice of mounting the outlet box on a bracket and the break-away extension system of Patent No. 4,399,922 limits adjustment to the number of inscribed weakening lines. Thus, there is a further need for an improved outlet box mounting bracket with a stabilizer which can be adjusted to accommodate to a wide range of differences in the space between drywalls so as to eliminate the need for having to make up a special bracket for each wall space size.

DISCLOSURE OF INVENTION

In accordance with the present invention, applicant provides a single thin sheet metal formed electrical outlet box mounting bracket for mounting outlet boxes having either two screw tabs and mounting screws on each of two opposed side walls or a pair of diagonally opposite screw tabs and mounting screws on opposed side walls. Of particular significance to the present invention is the presence of an adjustable stiffening arm or stabilizer such that the same bracket with appropriate adjustment may accommodate to a wide range of spacing between drywalls. The bracket also provides, as in the prior art, for slots or other openings to alleviate the need to remove the screws before attaching the outlet box and/or drywall ring and to provide for installation of the outlet box to the bracket and the brackets to the stud. The pulling of wire, making up of joints and installation of wiring devices inside the outlet box prior to attaching the drywall ring is facilitated without interference from the stabilizer. The box-mounting portion of the invention bracket in a preferred embodiment is offset slightly rearwardly from the face of the bracket so that when the bracket is mounted and the drywall ring is positioned, there will be no bulging or breaking of the finished drywall plaster on either side. The invention bracket may be made to accommodate either small or large size outlet boxes, such as the standard 4" or 4-11/16 inch sizes or other sizes.

DESCRIPTION OF DRAWINGS

FIG. 1 is a front elevation view of a bracket according to a first embodiment of the invention.

FIG. 2 is a top plan view of the bracket of FIG. 1.

FIG. 3 is an end view taken in the direction of line 3—3 of FIG. 1.

FIG. 8 is a side view of a second embodiment adjustable plate which mounts on the bracket of FIG. 1 to provide a second embodiment adjustable stabilizer.

FIG. 9 is an end view of the FIG. 8 plate taken in the direction of line 9—9.

FIG. 10 is an end view of the FIG. 8 plate taken in the direction line 10—10.

FIG. 11 is a top plan view of the FIG. 1 bracket with the FIG. 8 plate mounted in a first position.

FIG. 12 is an end view of the FIG. 11 bracket with the FIG. 8 plate shown in a solid line position corresponding to FIG. 11 and in a dashed line position corresponding to a wider drywall spacing.

BEST MODE FOR CARRYING OUT THE INVENTION

Using the referred to prior art patents for background, a conventional outlet box of standard 4" size, by way of example, carries a pair of diagonally-disposed corner fastening means typically in the form of mounting screws. A cooperating drywall ring of matching size has cooperating corner slots or openings for receiving the shanks of the screws prior to tightening as disclosed in the referenced prior art patents. The mentioned outlet box, screws and drywall ring are fully disclosed in the previously referenced prior art patents and are therefore not shown in the present drawings in order to better illustrate the adjustable bracket stabilizer of the present invention.

Figure 7:
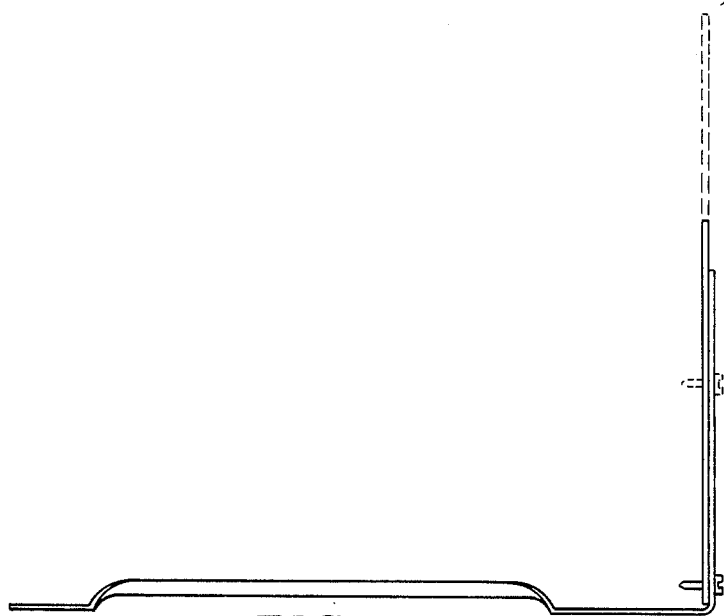
FIG. 7 is top plan view of the bracket of FIG. 6.
Figure 6:
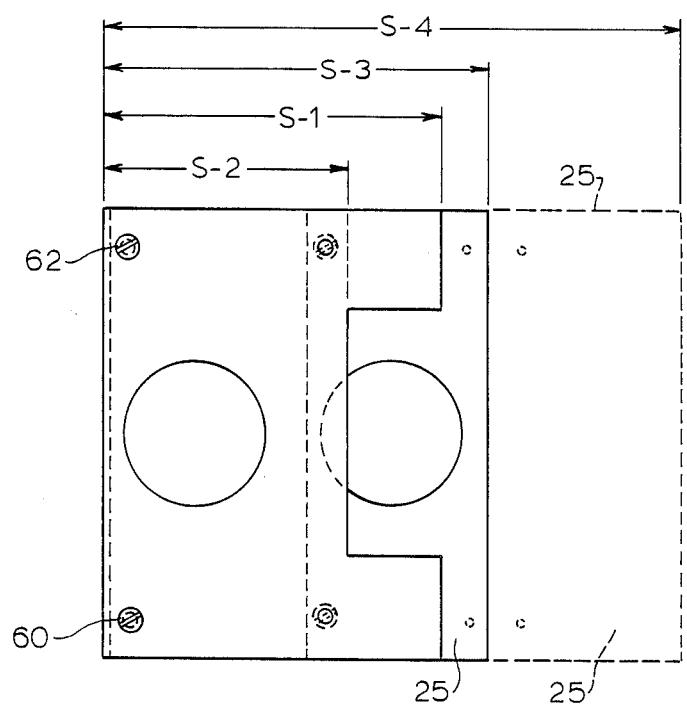
FIG. 6 is an end view of the bracket of FIG. 1 with the adjustable stabilizer plate of FIG. 4 mounted in one solid line position for one drywall spacing and in a dashed line position for a wider drywall spacing.

Making reference initially to FIGS. 1–7, an L-shaped mounting bracket 15 according to a first embodiment of the invention is formed from a single portion thin but rigid metal sheet for supporting the referred to outlet box and drywall ring on a metal wall stud. Bracket 15 includes a front panel 17 having a main central opening 18 to register with the open side of the outlet box. Of particular significance to the present invention is the provision of a rearwardly extending right angular stabilizing extension 19 adapted for receiving as illustrated in FIGS. 6 and 7 the adjustably positionable extension plate stabilizer 25 shown in FIGS. 4 and 5. As best seen in FIGS. 1 and 2, the front panel 17 of bracket 15 resides between offsets 34, 36 located adjacent the respective end portions 30, 32 residing in a plane parallel to the plane of front panel 17. A hole 38 is provided in bracket 15 and a comparable hole 40 in stabilizer plate 25 to facilitate wiring. The front panel 17 of bracket 15 is provided near its four corners with a group of access openings or slots 20, 20a, 20b, and 20c. The slots are sized to allow passage therethrough of the shanks of the outlet box mounting screws prior to tightening the screws to complete the joining of the outlet box and drywall ring to the mounting bracket 15 as has been fully described in the referenced prior art patents.

The bracket 15 is secured to the stud by means of mounting screws passing through a selected number of openings 50. Additional openings 52 are provided for receiving an extension plate as illustrated for example in FIG. 30 of Patent No. 4,603,789 or for allowing one bracket 15 to be mounted in a piggyback fashion to another bracket 15 as illustrated, for example, in FIG. 29 of U.S. Pat. No. 4,572,391.

Figure 13:
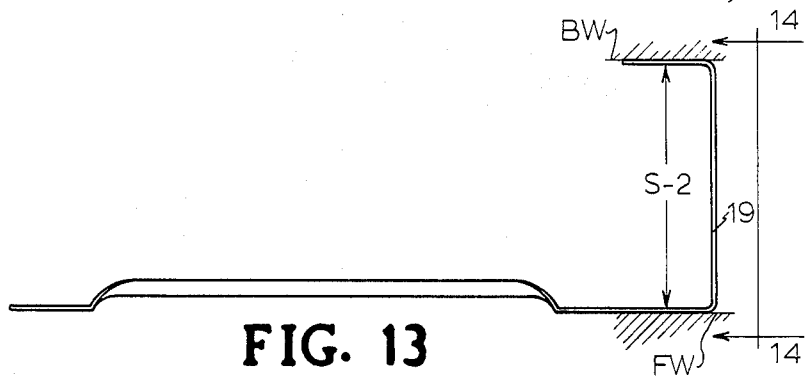
FIG. 13 is a top plan view of the FIG. 1 bracket with portions of the stabilizer bent according to a third embodiment of the invention.
Figure 14:
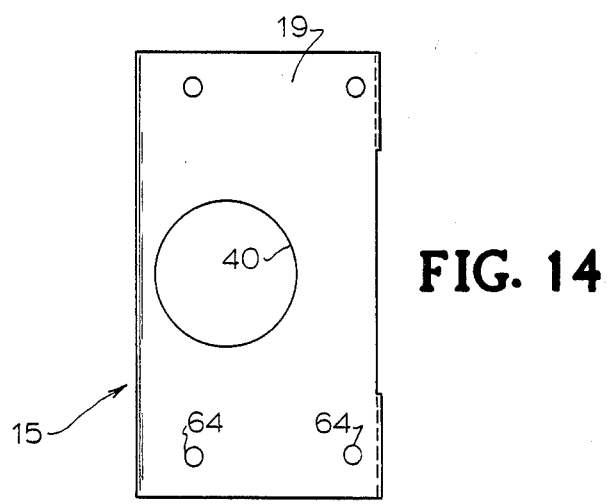
FIG. 14 is an end view taken in the direction of line 13—13 of the FIG. 13 bracket.
Figure 5:
FIG. 5 is an end view of the FIG. 5 adjustable plate.
Figure 4:
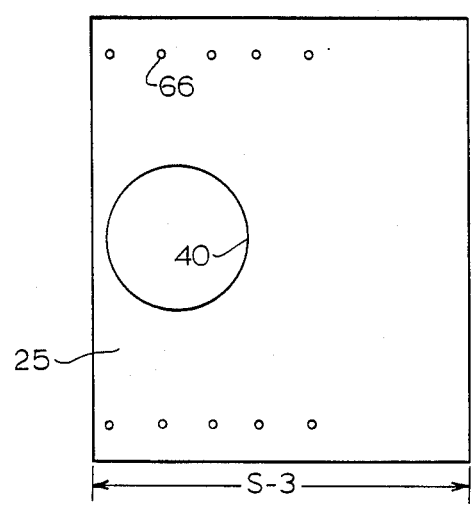
FIG. 4 is a side view of a first embodiment adjustable plate which mounts on the bracket of FIG. 1 to provide an adjustable stabilizer.

In one mode of use the stabilizer 19 matches the space S-1 between the front wall FW and the back wall BW. Assuming that an outlet box has been suitably secured to the front panel 17 and the end portion 32 suitably secured to a stud by passing screws through openings 50 stabilizer 19 stabilizes both the bracket 15 and the outlet box. Assuming that the space S-1 between the front drywall wall FW and the back drywall BW is equal to 3½" and the length of stabilizer 19 is also of substantially the same length bracket 15 can thus be used in such a 3½" spacing without any modification or use of the adjustable stabilizing plate 25 as shown in FIGS. 4, 6 and 7. When the wall spacing is at a minimum, for example 2½", the laterally-spaced leg portions 56, 58 on opposite sides of slot 59 may be bent along the reference lines L1, L2, (FIG. 3) to assume a right angle position as in FIGS. 13 and 14. Thus the dimension S2 can be made substantially equal to 2½" thereby accommodating this relatively narrow wall spacing without having a employ the adjustable extension plate 25.

To accommodate to a wider spacing between the front wall FW and the backwall BW the extension plate 25 (FIG. 4) is secured by a pair of screws 60, 62 passing through appropriate openings 64 in bracket 15 and openings 66 in extension plate 25. By selecting the dimension S-3 to be substantially equal to another conventional wall spacing, namely a 4" spacing, it can be seen that by use of the stabilizing extension plate 25 with bracket 15 as in the solid position of FIGS. 6 and 7 the bracket immediately accommodates to the wall spacing equal to the dimension S-3. According to conventional practice dimension S-3 would be 4".

As further illustrated in FIGS. 6 and 7, plate 25 can be positioned in its outermost position corresponding to the illustrated dimension S-4 which, for example, would correspond to a 6" spacing between the front wall FW and backwall BW. While not illustrated in FIGS. 6 and 7, it will also be appreciated that plate 25 could be secured in a position corresponding to a wall spacing dimension between dimension S-3 and dimension S-4 as for example a wall spacing of 5". What has thus been described in a bracket which without the use of the extension plate accommodates to two wall spacing dimensions, namely S-1 and S-2 and with the extension plate accommodates to numerous other wall spacings corresponding to which of the holes 66 in plate 25 are mated to which of the holes 64 in bracket 15.

Making reference next to FIGS. 8–12 bracket 15 is shown in use with a modified extension plate 70 having a wiring opening 72 comparable to the previously mentioned wiring opening 40. Plate 70 attaches to stabilizer 19 by means of a pair of screws 74, 76 passing through a mating pair of selected openings 64 in bracket 15. Dimension S-5 of extension plate 70 in one embodiment is equal to 4" such that when secured in the solid line position of FIGS. 11 and 12 dimension S-5 corresponds to the wall spacing of 4". On the other hand, when extension plate 70 is adjusted outwardly as indicated in dashed lines in FIG. 12 a dimension S-6 coresponding to a 6" wall spacing is obtained. Also to be noted is that when plate 70 is mounted as in the dashed line position of FIG. 12 the outer leg portions 80, 82 can be bent along the reference bend lines L-3 and L-4 (FIG. 8) to obtain a dimension corresponding to a 4" wall spacing.

In summary, it can be seen that the invention bracket when accompanied by the invention extension plate stabilizer enables the electrician to immediately assemble a stabilized outlet box supporting bracket to meet any of the conventional wall spacings, namely, 2½", 3½", 4", 5", or 6" as presently practiced in the trade.

It is to be understood that the form of the invention herewith shown and described is to be taken as preferred example of the same, and that various changes in the shape, size and arrangement of parts may be resorted to, without departing from the spirit of the invention or scope of the appended claims.

What is claimed is:

1. An outlet box mounting assembly comprising:
   (a) a mounting bracket formed from a unitary section of stiff sheet material including:
      (i) a flat plate body portion having at least one relatively large central opening of a size and shape to register substantially with the interior chamber of an outlet box and end portions on opposite ends of said body portion forming extensions thereof, said flat plate body portion and end portions residing in offset substantially parallel planes separated by at least one defined offset formed in said bracket between said body portion and an end portion;
      (ii) at least a pair of screw shank receiving slots formed through said flat plate body portion and disposed on a diagonal axis across said relatively large central opening; and
      (iii) at least one right angular stabilizing rectangular plate extension disposed on one side of one of said end portions and extending outwardly therefrom, said plate extension terminating with at least one section of reduced width forming at least one leg portion having an outermost edge adapted to engage an opposing wall surface during use and being bendable without breaking to reside in a plane substantially parallel to said flat plate body portion and spaced a selected distance therefrom enabling the size of said plate extension to be reduced.

2. An outlet box mounting assembly as claimed in claim 1 including an auxiliary extension plate adjustably mounted on said plate extension enabling the effective size of said plate extension to be increased without bending said leg portion.

3. An outlet box mounting assembly as claimed in claim 1 wherein said section includes a slotted portion forming a pair of laterally-spaced, said leg portions, both of which are bendable without breaking to reside in a plane substantially parallel to said flat plate body portion and spaced a selected distance therefrom.

4. An outlet box mounting assembly as claimed in claim 2 wherein said auxiliary extension plate is formed with a slotted section forming laterally-spaced leg portions each having an outermost edge adapted to engage an opposing wall surface during use and being bendable without breaking to reside in a plane substantially parallel to said flat plate body portion and spaced a selected distance therefrom enabling the size of said plate extension to be reduced.

5. An outlet box mounting assembly comprising:
   (a) a mounting bracket formed from a unitary section of stiff sheet material including:
      (i) a flat plate body portion having at least one end portion;
      (ii) at least one right angular stabilizing rectangular plate extension disposed on one side of said end portion and extending outwardly therefrom, said plate extension terminating with at least one section of reduced width forming at least one leg portion having an outermost edge adapted to engage an opposing wall surface during use and being bendable without breaking to reside in a plane substantially parallel to said flat plate body portion and spaced a selected distance therefrom enabling the size of said plate extension to be reduced.

6. An outlet box mounting assembly as claimed in claim 5 including an auxiliary extension plate adjustably mounted on said plate extension enabling the effective size of said plate extension to be increased.

7. An outlet box mounting assembly as claimed in claim 5 wherein said section includes a slotted portion forming a pair of laterally-spaced, said leg portions, both of which are bendable without breaking to reside in a plane substantially parallel to said flat plate body portion and spaced a selected distance therefrom.

8. An outlet box mounting assembly comprising:
   (a) a mounting bracket formed from a unitary section of stiff sheet material including:
      (i) a flat plate body portion having at least one end portion;
      (ii) at least one right angular stabilizing rectangular plate extension disposed on one side of said end portion and extending outwardly therefrom, said plate extension terminating with a slotted section forming a pair of laterally-spaced leg portions each having an outermost edge adapted to engage an opposing wall surface during use, both of which are bendable without breaking to reside in a plane substantially parallel to said flat plate body portion and spaced a selected distance therefrom enabling the size of said plate extension to be reduced; and
      (iii) an auxiliary extension plate adjustably mounted on said plate extension enabling the effective size of said plate extension to be increased.

9. An outlet box mounting assembly as claimed in claim 8 wherein said auxiliary extension plate is formed with a slotted section forming laterally-spaced leg portions each having an outermost edge adapted to engage an opposing wall surface during use and both of which are bendable without breaking to reside in a plane parallel to said flat plate body portion and spaced a selected distance therefrom enabling the size of said plate extension to be reduced.

* * * * *

UNITED STATES PATENT AND TRADEMARK OFFICE
CERTIFICATE OF CORRECTION

PATENT NO. : 4,732,356

DATED : March 22, 1988

INVENTOR(S) : Lewis B. Medlin, Sr.

It is certified that error appears in the above-identified patent and that said Letters Patent is hereby corrected as shown below:

Column 3, line 32, correct "portion" to read --section--.

Column 4, line 13, correct "a" to read --to--.

Signed and Sealed this

Nineteenth Day of July, 1988

Attest:

DONALD J. QUIGG

*Attesting Officer*  *Commissioner of Patents and Trademarks*